Sept. 20, 1932.     H. W. REID     1,877,971
EXTRACTOR CUP FOR COFFEE FILTERS
Filed Dec. 3, 1930
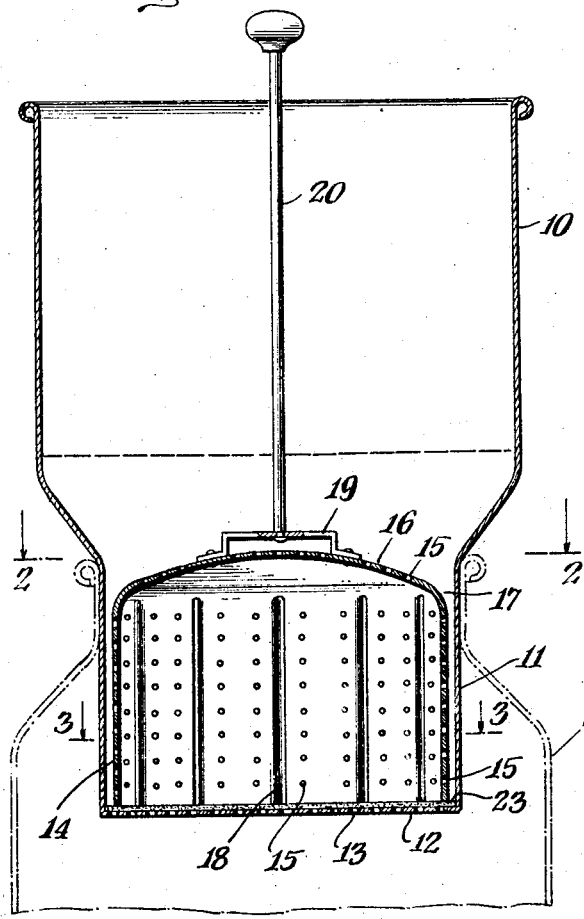
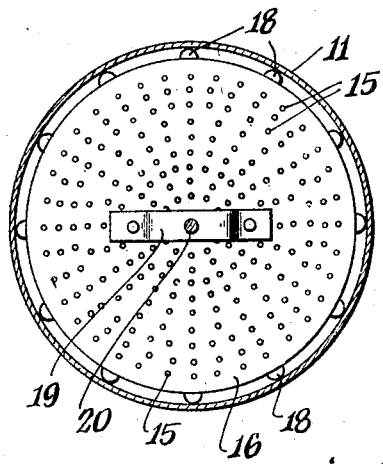
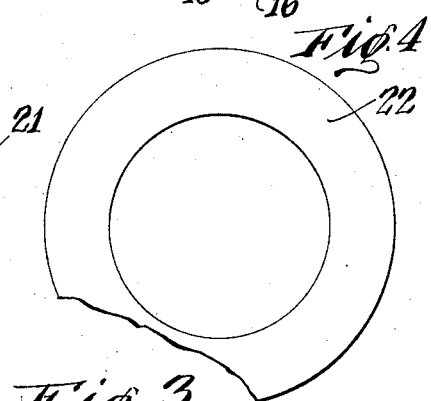
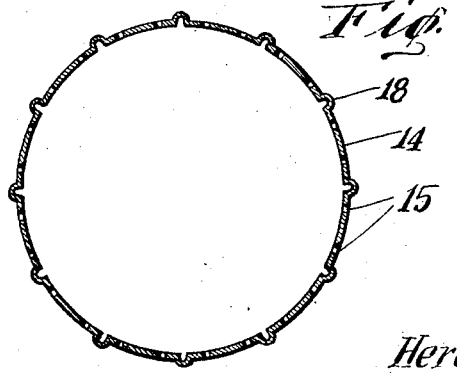
Inventor
Herbert W. Reid
By his Attorney
George C. Heinicke Patented Sept. 20, 1932

1,877,971

UNITED STATES PATENT OFFICE

HERBERT WESLEY REID, OF BROOKLYN, NEW YORK

EXTRACTOR CUP FOR COFFEE FILTERS

Application filed December 3, 1930. Serial No. 499,750.

This invention relates to improvements in coffee filters, and it is the principal object of my invention to provide a filter equipped with a novel and improved type of extractor cup equipped with a plurality of series of openings separated by ridges frictionally engaging the inner wall of the shell with which the extractor cup is to be used to space both in order to allow the boiling water between the outer shell and the cup to enter the same through the numerous perforations for side infiltration producing a quicker extraction because of a quicker infusion of coffee and water and a more complete extraction because the water is permitted by means of the lateral extractor cup holes to more completely infuse the coffee contained therein.

Another object of my invention is the provision of an extractor cup of comparatively simple and therefore inexpensive construction, yet durable and highly efficient in operation.

A further object of my invention is the provision of an extractor cup having its top provided with numerous perforations and connected to or made integrally with its perforated and ridged side walls by rounded edges allowing a thorough cleaning.

A still further object of my invention is the provision of an adaptor ring, preferably made of metal to be placed directly onto the filter paper on the bottom of the cup for cutting down the dripping surface if three or less than three cups of coffee are being made to ensure perfect percolation and extraction.

These and other objects and advantages of my invention will become more fully known as the description thereof proceeds and will then be specifically defined in the appended claims.

In the accompanying drawing forming a material part of this disclosure:

Fig. 1 is a vertical central sectional view showing a container equipped with an extractor cup constructed according to my invention on a coffee pot shown fragmentarily and in broken lines.

Fig. 2 is a top plan view of the extractor cup in section on line 2—2 of Figure 1.

Fig. 3 is a cross-section on line 3—3 of Figure 1.

Fig. 4 shows in detail view a metal adapter ring.

As illustrated, a shell or reservoir 10 for the hot water has a reduced lower portion 11 equipped with a perforated bottom 12, the perforations of which are designated 13.

The extractor cup proper 14 adapted to be placed into the shell has perforations 15 in its side walls and top 16, and the edges uniting top and side walls are rounded, as at 17.

The perforations in the side walls are arranged in rows which are separated by ridges 18 vertically extending over the length of the extractor cup and adapted to frictionally engage the inner wall of the reduced lower portion 11 of the shell 10 and to space the cup therefrom. A handle 19 is attached to the top 16 and has secured thereto a lifter 20 of any desired form and dimension to allow a ready lifting of the extractor cup from the shell.

As illustrated in broken lines in Figure 1, the shell may be placed on a coffee pot 21 of any conventional type.

In Figure 4, I have shown a metal adapter ring 22 to be placed directly on the filter paper 23 to cut down the dripping surface if a small quantity of coffee as for instance 3 cups or less is to be made.

The filter paper 23 is laid upon the perforated bottom 12 of the shell 10 so as to cover all perforations thereof, the measured amount of coffee is placed upon the filter paper, and the extractor cup is placed into the reduced portion or neck of the shell with its ridges frictionally engaging the inner wall of the shell to space the same therefrom.

If now boiling water is measured and poured into the shell or reservoir 10, it will immediately act upon the bed of coffee, both through the top perforations and also through the perforations of the side walls and the water will, in this way enter from two directions from the top as well as from the side walls. In this manner a quicker extraction on account of a quicker infusion of coffee and water as well as a more complete extraction will be obtained as it is possible with the numerous known devices of this character, and this must be considered an important progress in the art, as it avoids waste of coffee and produces a coffee much stronger and with a better aroma.

Furthermore, in making less than three cups of coffee water would have a tendency to pass too quickly through the filter paper and the perforations in the shell, and this is effectively avoided by using the metal adapter 22 by placing the same directly on the filter paper which has the effect of reducing the original dripping surface of about 3¼ inches which is suitable for larger amounts of coffee to 2½ inches which is the efficient area for making smaller amounts as for instance 3 cups or less.

For instance two spoons full of coffee are placed directly on the metal adapter and the operation is proceeded with as described for the larger amount. The use of this metal adapter eliminates any moving parts or any plungers usually required in the making of two cups of beverage in a six, nine, or ten cup percolator model.

It will be understood that I have described and shown the preferred form of my invention only as one example of the many possible ways to practically construct the same, and that I may make such changes in its general arrangement and in the construction of the minor details thereof as come within the scope of the appended claims without departure from the spirit of my invention and the principles involved.

Having thus described my invention, what I claim as new and desire to secure by Letters Patents is:

1. In a filter including a shell, an extractor cup having a perforated top and side walls perforated by series of perforations, a ridge separating each group of the series of perforations projecting beyond the plane of the cup wall to space the same from the inner wall of its shell, and a means for cutting down the dropping surface of the shell for percolating a small amount of coffee.

2. A coffee filter including a shell having a reduced lower neck part, an extractor cup having its side walls perforated, a filtering paper in said shell and a perforated top merging into said cup with rounded edges, a means for lifting said cup from said shell, and a plurality of ridges vertically extending across the outer cup walls in spaced relation to frictionally engage the neck part of said shell, guide said cup therein, and space cup and shell for allowing a perfect infusion of coffee and water, and a means on said filtering paper for cutting down the dripping surface of the shell for percolating a small amount of coffee.

3. In an extractor cup for coffee filters including a shell, a perforated bottom for said shell, a filter paper for the deposition of the coffee, placed on said bottom covering all perforations thereof, a perforated top and side walls for said cup, said top merging into the side walls with rounded portions, the perforations in the side walls arranged in groups of rows, and vertical ridges extending over the length of the cup separating the individual groups of rows and engaging the inner wall of the shell to provide spaces promoting the infusion of coffee and water and a complete extraction of the coffee, and a metal adaptor ring adapted to be placed on said filter paper to reduce the dripping surface in case a small quantity of coffee is to be made.

Signed at Brooklyn in the county of Kings and State of New York this 21st day of November, 1930 A. D.

HERBERT WESLEY REID.